(12) United States Patent
Coolidge

(10) Patent No.: US 9,683,586 B2
(45) Date of Patent: Jun. 20, 2017

(54) HYDRAULIC SECTIONAL CONTROL VALVE WITH MULTIPLE RELIEF SLOTS

(71) Applicant: Parker-Hannifin Corporation, Cleveland, OH (US)

(72) Inventor: Gregory Coolidge, Elyria, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 15/302,551

(22) PCT Filed: Apr. 30, 2015

(86) PCT No.: PCT/US2015/028452
§ 371 (c)(1),
(2) Date: Oct. 7, 2016

(87) PCT Pub. No.: WO2015/168369
PCT Pub. Date: Nov. 5, 2015

(65) Prior Publication Data
US 2017/0023026 A1   Jan. 26, 2017

Related U.S. Application Data

(60) Provisional application No. 61/986,183, filed on Apr. 30, 2014.

(51) Int. Cl.
*F16K 11/20* (2006.01)
*F15B 13/04* (2006.01)
(Continued)

(52) U.S. Cl.
CPC ...... *F15B 13/0403* (2013.01); *F15B 13/0402* (2013.01); *F15B 13/0418* (2013.01);
(Continued)

(58) Field of Classification Search
USPC .......................................................... 137/884
See application file for complete search history.

(56) References Cited

U.S. PATENT DOCUMENTS 3,406,989 A   10/1968   Friedrich
3,722,540 A   3/1973   Mazur et al.
(Continued)

FOREIGN PATENT DOCUMENTS

DE   35 03 070 A1   8/1986

OTHER PUBLICATIONS

International Search Report and Written Opinion for corresponding Patent Application No. PCT/US2015/028452 dated Aug. 11, 2015.

*Primary Examiner* — John Fox
(74) *Attorney, Agent, or Firm* — Renner, Otto, Boisselle & Sklar, LLP

(57) ABSTRACT

A working valve section for a sectional fluid control valve comprising a valve section housing having a substantially planar surface for being attached to an adjacent valve section housing; a main control spool bore (43) extending into the housing substantially parallel to the planar surface; a compensator spool bore (46) extending into the housing substantially parallel to the planar surface, the compensator spool bore being spaced from the main control spool bore; a first relief slot (49a) extending across the planar surface substantially coextensive with the main control spool bore; and a second relief slot (49b) extending across the planar surface substantially coextensive with the compensator spool bore.

20 Claims, 4 Drawing Sheets

(51) Int. Cl.
*F15B 13/08* (2006.01)
*F16K 27/04* (2006.01)
*F16K 27/00* (2006.01)

(52) U.S. Cl.
CPC ........ *F15B 13/0839* (2013.01); *F16K 27/003* (2013.01); *F16K 27/041* (2013.01); *F15B 13/0417* (2013.01)

(56) References Cited

U.S. PATENT DOCUMENTS

| | | | |
|---|---|---|---|
| 3,840,047 A | 10/1974 | Gibbins | |
| 7,021,332 B2 * | 4/2006 | Greenwood | F15B 13/0821 137/596 |
| 7,096,889 B1 * | 8/2006 | Roys | F15B 13/0817 137/884 |
| 8,220,495 B2 * | 7/2012 | Nakata | F16K 27/003 137/884 |
| 8,465,268 B2 * | 6/2013 | Baxter | E21B 43/25 417/437 |
| 9,212,781 B2 * | 12/2015 | Roys | F16K 11/07 |
| 2006/0038399 A1 * | 2/2006 | Tremoulet, Jr. | B24C 9/00 285/124.5 |
| 2011/0081268 A1 * | 4/2011 | Ochoa | F04B 53/12 417/521 |

\* cited by examiner

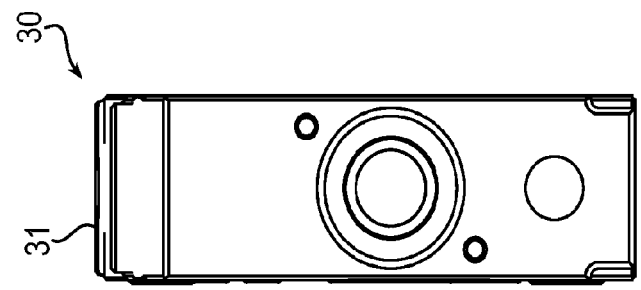
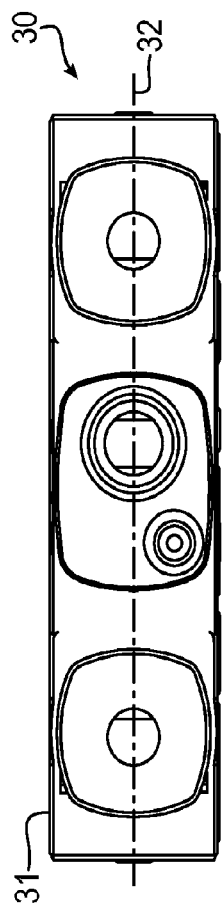
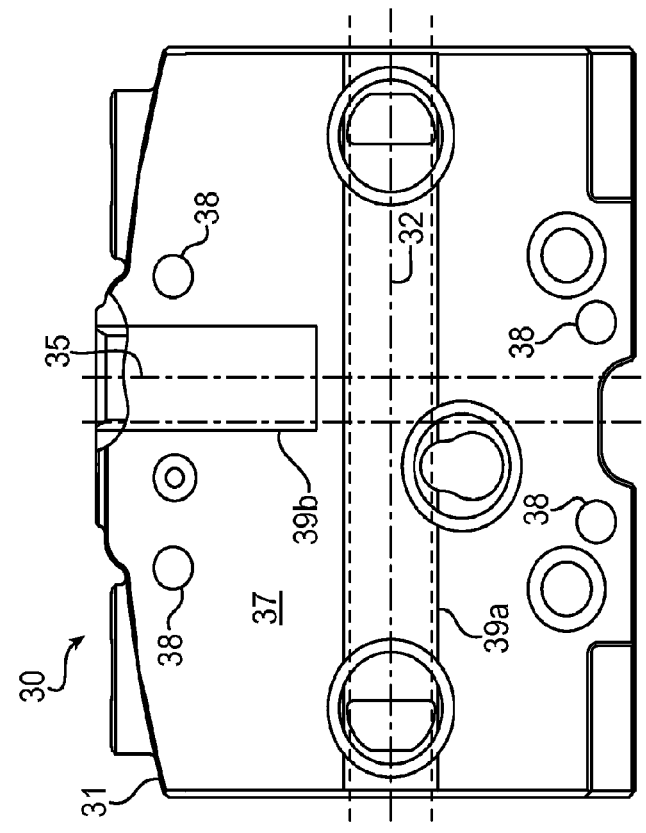

HYDRAULIC SECTIONAL CONTROL VALVE WITH MULTIPLE RELIEF SLOTS

RELATED APPLICATIONS

This application is a national phase of International Application No. PCT/US2015/028452 filed Apr. 30, 2015 and published in the English language, which claims priority to U.S. Provisional Patent Application No. 61/986,183 filed Apr. 30, 2014, which are hereby incorporated herein by reference in their entirety.

FIELD OF INVENTION

The present invention relates generally to a fluid control valve, and more particularly to a hydraulic sectional control valve having relief slots for relieving stress on spool bores.

BACKGROUND

Fluid control valves are used in a wide variety of applications for causing and controlling motion of various components. Hydraulic fluid control valves and systems are used in such applications when relatively large forces are to be transmitted and controlled through such components.

One type of hydraulic fluid control valve is a sectional valve. A sectional valve may typically include a plurality of separate cast and machined metal working valve sections. Each valve section may include internal fluid passages, external ports, and spool bores with valve spools slidably disposed within the spool bores. The spool bores may include main control valve spool bores in which main control valve spools are slidably disposed, and compensator spool bores in which compensator spools are slidably disposed to maintain predetermined pressure drops across the main control spools or to otherwise control fluid pressure. The spool bores and the spools are precisely machined, so that the spools slide freely in the bores with minimal clearance and minimal fluid leakage between the spool and the bore.

The valve sections typically include precisely machined substantially planar or flat surfaces, and the valve sections are assembled together with the flat surfaces of adjacent sections contacting one another. Tie rod holes extend through the sections, and tie rods extend through the holes. A torque is applied to the tie rods to assemble the sections tightly together without fluid leakage between the sections. This assembly torque establishes a compressive load within the sections of the valve, and this compressive load may cause a distortion within the sections. This distortion may be particularly troublesome when the distortion occurs around a spool bore, because the diametrical clearance between the bore internal diameter and the spool outer diameter tends to be very small, for example in the range of 0.0002 of an inch. Excessive spool bore distortion can cause the spool to bind within the bore, which is detrimental to the operation of the hydraulic sectional valve. Because the diametrical clearance needs to be small to keep leakage around the spool to an acceptable level, increasing the diametrical clearance to allow for increased spool bore distortion may not always provide a valid solution to compensate for spool bore distortion that results from tie rod assembly torque.

SUMMARY OF INVENTION

Therefore, presented herein are exemplary embodiments to reduce the amount of spool bore distortion by providing a first relief slot extending along the axis of the main control spool bore, and a second relief slot extending along the axis of the compensator spool bore. Preferred embodiments also provides additional features and advantages described below.

According to one aspect of the invention, a working valve section for a sectional fluid control valve includes a valve section housing having a substantially planar surface for being attached to an adjacent valve section housing; a main control spool bore extending into the housing substantially parallel to the planar surface; a compensator spool bore extending into the housing substantially parallel to the planar surface, the compensator spool bore being spaced from the main control spool bore; a first relief slot extending across the planar surface substantially coextensive with the main control spool bore; and a second relief slot extending across the planar surface substantially coextensive with the compensator spool bore.

Optionally, the first and second relief slots are each elongated and are each substantially perpendicular to the other.

Optionally, the first and second relief slots are spaced from one another.

Optionally, the valve section includes a second valve section, the second valve section includes a second housing having a second substantially planar surface, and the second substantially planar surface is attached to the first mentioned substantially planar surface.

Optionally, the main control spool bore is substantially perpendicular to the compensator spool bore.

Optionally, the relief slots are approximately 0.0005-0.002 inches deep.

Optionally, the first relief slot is 10-50% wider than the spool bore.

Optionally, the first relief slot is 10-25% wider than the spool bore.

Optionally, the first relief slot is 20-50% wider than the spool bore.

Optionally, the second relief slot includes rounded corners.

According to another aspect, a working valve section for a sectional fluid control valve includes a valve section housing having a substantially planar surface for being attached to an adjacent valve section housing; a main control spool bore extending into the housing substantially parallel to the planar surface; a compensator spool bore extending into the housing substantially parallel to the planar surface, the compensator spool bore being spaced from the main control spool bore; and a relief area extending across the planar surface substantially coextensive with the main control spool bore and the compensator spool bore. The substantially planar surface includes an area positioned between the main control spool bore and the compensator spool bore that protrudes above the relief area.

Optionally, the relief area includes first and second relief slots that are each elongated and are each substantially perpendicular to the other.

Optionally, the first and second relief slots are spaced from one another.

Optionally, the working valve section includes a second valve section, the second valve section includes a second housing having a second substantially planar surface, and the second substantially planar surface is attached to the first mentioned substantially planar surface.

Optionally, the main control spool bore is substantially perpendicular to the compensator spool bore.

Optionally, the relief slots are approximately 0.0005-0.002 inches deep.

Optionally, the first relief slot is 10-50% wider than the spool bore.

Optionally, the first relief slot is 10-25% wider than the spool bore.

Optionally, the first relief slot is 20-50% wider than the spool bore.

Optionally, the second relief slot includes rounded corners.

The foregoing and other features of the invention are hereinafter described in greater detail with reference to the accompanying drawings.

BRIEF DESCRIPTION OF THE DRAWINGS

FIG. 3a is a side elevation view of a valve section according to a first preferred embodiment of the present invention;

FIG. 3b is a top view of the valve section illustrated in FIG. 3a;

FIG. 3c is an end view of the valve section illustrated in FIG. 3a; and

DETAILED DESCRIPTION

Figure 1:
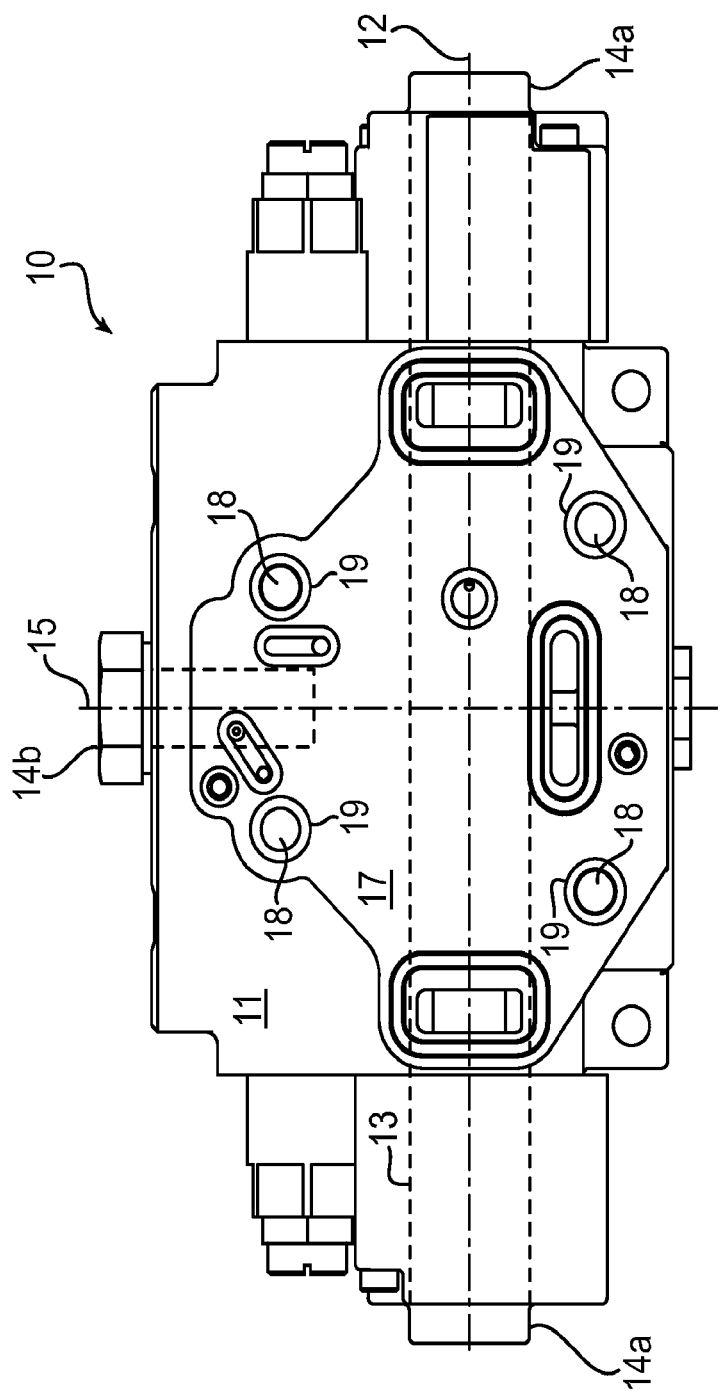
FIG. 1 is a side elevation view of a prior art valve section, in which shims are used to minimize spool bore distortion.

Referring now to the drawings in greater detail, FIG. 1 illustrates a prior art hydraulic valve section 10. The valve section 10 is one section of a complete sectional hydraulic valve (not shown) that includes multiple sections secured together by tie rods (not shown). The valve section 10 includes a cast and machined metal housing 11 having a longitudinal axis 12. A main control valve spool bore 13 extends along the longitudinal axis 12 from side to side through the housing 11 and is closed by threaded end caps 14a. The housing 11 also has a vertical axis 15, and a compensator spool blind bore 16 extends along the vertical axis 15 and is closed by threaded end cap 14b. A main control valve spool (not shown) is slidably disposed in the main control valve spool bore 13, and a compensator spool (not shown) is slidably disposed in the compensator spool bore 16. The housing 11 also includes a machined substantially planar surface 17, and a plurality of tie rod holes 18 extend from the surface 17 completely through the housing 11 in a direction substantially perpendicular to the planar surface 17.

To minimize distortion of the spool bores 13 and 16 of the valve section 10 when the valve section 10 is assembled with other valve sections (not shown) to provide a complete multi-function hydraulic sectional valve (not shown), flat annular washer shaped shims 19 are provided at the location of each hole 18. A tie rod (not shown) extends through each hole 18 and through its associated shim 19. The shims 19 are placed onto the tie rods during the assembly process, and the tie rods are torqued to secure the valve sections together under stress in a fluid tight manner. The thickness of the shims 19 creates a small gap between the valve sections, and this prevents or minimizes stress being applied to the housing 11 at the location of the spool bores 13 and 15 to prevent or minimize distortion of the spool bores 13 and 15. The disadvantage of the shims 19 is that it may be difficult to control the assembly process, since the shims need to be very thin (for example, on the order of 0.001 inch) and it is difficult to assure that just one shim or other prescribed number of shims gets assembled at a time. This is especially true when assembling in the presence of hydraulic oils since the oil may tend to cause the shims to stick together and since the shims are very thin.

Figure 2:
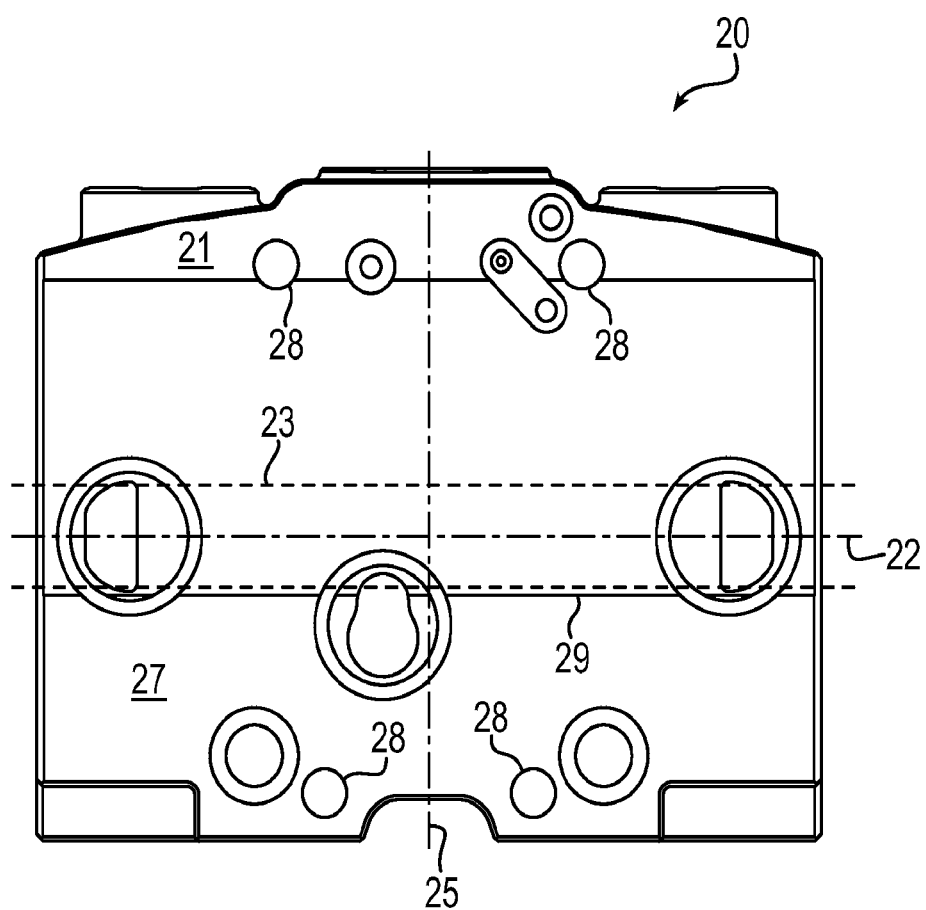
FIG. 2 is a side elevation view of another prior art valve section, in which a single relief slot is used to minimize spool bore distortion.

Another way in which spool bore distortion is minimized in prior art hydraulic sectional valves is illustrated in FIG. 2. FIG. 2 illustrates a prior art hydraulic valve section 20. The valve section 20 is one section of a complete sectional hydraulic valve (not shown) that includes multiple sections secured together by tie rods (not shown). The valve section 20 includes a cast and machined metal housing 21 having a longitudinal axis 22. A main control valve spool bore 23 extends along the longitudinal axis 22 from side to side through the housing 21 and is closed by threaded end caps (not shown). The housing 21 also has a vertical axis 25, and a compensator spool blind bore (not shown) extends parallel to the axis 25 and is closed by a threaded end cap (not shown). A main control valve spool (not shown) is slidably disposed in the main control valve spool bore 23, and a compensator spool (not shown) is slidably disposed in the compensator spool bore. The housing 21 also includes a machined substantially planar assembly surface 27, and a plurality of tie rod holes 28 extend from the surface 27 completely through the housing 21 in a direction substantially perpendicular to the planar surface 27.

To minimize distortion of the spool bores of the valve section 20 when the valve section 20 is assembled with other valve sections (not shown) to provide a complete multi-function hydraulic sectional valve (not shown), a single relief slot 29 is provided. The relief slot 29 extends longitudinally across the surface 27 of the valve section 20, and the relief slot 29 has a depth (into the plane of the surface 27) that is very shallow and on the order of magnitude of the thickness of one or more of the shims described above in connection with FIG. 1. The vertical width of the slot 29 is substantially greater than the diameter of the main spool bore 23. The disadvantage with the single relief slot 29 is that the amount of bearing area on the section 20 seal area gets smaller as the area of the slot 29 gets larger. This may reduce the life of the section 20 since the pre-load that is created within the valve sections when they are torqued together may not get applied to an area of the valve section 20 that is under high pressure during operation. The small gap that is created may allow for distortion of the section 20 when under pressure thus creating higher stresses in that part of the section 20, than if the small gap were not there.

A third way to minimize distortion in valve spool bores is by honing the hydraulic sectional main control valve spool bore as a complete assembly. The spool bore gets manufactured to its final size after the individual valve sections of the hydraulic sectional valve have been assembled with the tie rods and torqued. This guarantees that any spool bore distortion that occurred during assembly doesn't adversely affect the spool to spool bore fit. The disadvantage of this method is that it may be more difficult and/or more costly in comparison with the above described shims and single slot.

As illustrated in FIGS. 3a-3c, a first preferred embodiment of the present invention provides a hydraulic valve section 30. The valve section 30 is one section of a complete sectional hydraulic valve (not shown) that includes multiple sections secured together by tie rods (not shown). The valve section 30 includes a cast and machined metal housing 31 having a longitudinal axis 32. A main control valve spool bore (not shown) extends along the longitudinal axis 32 from side to side through the housing 31 and is closed by threaded end caps (not shown). The housing 31 also has a vertical axis 35, and a compensator spool blind bore (not shown) extends along or parallel to the axis 35. A main control valve spool (not shown) is slidably disposed in the main control valve spool bore 33, and a compensator spool (not shown) is slidably disposed in the compensator spool bore. The housing 31 also includes a machined substantially planar surface 37, and a plurality of tie rod holes 38 extend from the surface 37 completely through the housing 31 in a direction substantially perpendicular to the planar surface 37.

To minimize distortion of the spool bores of the valve section 30 when the valve section 30 is assembled with other valve sections (not shown) to provide a complete multi-function hydraulic sectional valve (not shown), first and second relief slots 39a and 39b are provided. The first relief slot 39a extends longitudinally from side to side across surface 37 of the valve section 30, and the relief slot 39a has a depth in a direction perpendicular to the surface 37 that is very shallow and on an order of magnitude of the thickness of one or more of the shims described above in connection with FIG. 1. The second relief slot 39b extends vertically from the top of the valve section 30 substantially perpendicular to the direction of the first relief slot 39a, and the relief slot 39b preferably does not extend vertically to the bottom of the valve section 30. The second relief slot 39b also has a depth that is very shallow and on the order of magnitude of the thickness of one or more of the shims described above in connection with FIG. 1, and the depth of the second relief slot 39b is preferably substantially equal to the depth of the first relief slot 39a. In particular, a preferable depth for this slot in relatively high pressure settings is between 0.0005 inches and 0.002 inches. In low pressure settings, this depth may be increased which makes manufacturing easier. The second relief slot 39b preferably terminates a distance from the first relief slot 39a. By providing separate relief slots for the main control valve spool bore and for the compensator spool bore, the areas of the relief slots can be minimized while distortion stress on the spool bores is also minimized. In particular, the width of the relief slots is preferably between 10% and 50% wider than the width of the respective spool bores. In some embodiments, the relief slots are 10-20% wider, and in other embodiments, relief slots are 20-50% wider. In any case, a portion of surface 37 is positioned between the two spool bores so as to prevent localized distortion.

Figure 4:
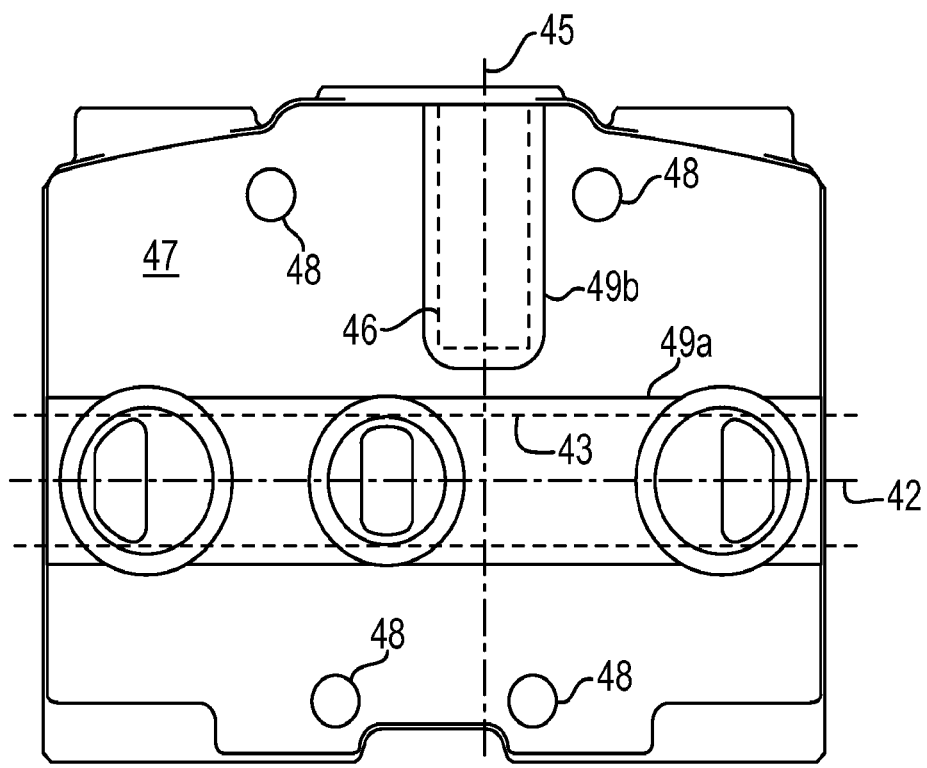
FIG. 4 is side elevation view of a second embodiment of the invention, which is similar to the valve section illustrated in FIG. 3a but with modifications.

FIG. 4 is a view similar to FIG. 3a, but illustrating a second embodiment of the invention which is similar to the first embodiment valve section with minor modifications. The valve section 40 is one section of a complete sectional hydraulic valve (not shown) that includes multiple sections secured together by tie rods (not shown). The valve section 40 includes a cast and machined metal housing 41 having a longitudinal axis 42. A main control valve spool bore 43 extends along the longitudinal axis 42 from side to side through the housing 41 and is closed by threaded end caps (not shown). The housing 41 also has a vertical axis 45, and a compensator spool blind bore 46 extends along the vertical axis 45. A main control valve spool (not shown) is slidably disposed in the main control valve spool bore 43, and a compensator spool (not shown) is slidably disposed in the compensator spool bore 46. The housing 41 also includes a machined substantially planar surface 47, and a plurality of tie rod holes 48 extend from the surface 47 completely through the housing 41 in a direction substantially perpendicular to the planar surface 47.

To minimize distortion of the spool bores of the valve section 40 when the valve section 40 is assembled with other valve sections (not shown) to provide a complete multi-function hydraulic sectional valve (not shown), first and second relief slots 49a and 49b are provided. The first relief slot 49a extends longitudinally from side to side across surface 47 of the valve section 40, and the relief slot 49a has a depth in a direction perpendicular to the surface 47 that is very shallow and on an order of magnitude of the thickness of one or more of the shims described above in connection with FIG. 1. The second relief slot 49b extends vertically from the top of the valve section 40 substantially perpendicular to the direction of the first relief slot 49a, and the relief slot 49b preferably does not extend vertically to the bottom of the valve section 40. The second relief slot 49b also has a depth that is very shallow and on an order of magnitude of the thickness of one or more of the shims described above in connection with FIG. 1, and the depth of the second relief slot 49b is preferably substantially equal to the depth of the first relief slot 49a. In particular, a preferable depth for this slot in relatively high pressure settings is between 0.0005 inches and 0.002 inches. In low pressure settings, this depth may be increased which makes manufacturing easier. The second relief slot 49b preferably terminates a distance from the first relief slot 49a. By providing separate relief slots for the main control valve spool bore and for the compensator spool bore, the areas of the relief slots can be minimized while distortion stress on the spool bores is also minimized. In particular, the width of the relief slots is preferably between 10% and 50% wider than the width of the respective spool bores. In some embodiments, the relief slots are 10-20% wider, and in other embodiments, relief slots are 20-50% wider. In any case, a portion of surface 37 is positioned between the two spool bores so as to prevent localized distortion. This embodiment also depicts rounded corners at the terminal end of slot 49b. These rounded corners are a product of machining the slot with a surface rotary milling bit.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A working valve section for a sectional fluid control valve comprising:
   a valve section housing having a substantially planar surface for being attached to an adjacent valve section housing;

a main control spool bore extending into the housing substantially parallel to the planar surface;

a compensator spool bore extending into the housing substantially parallel to the planar surface, the compensator spool bore being spaced from the main control spool bore;

a first relief slot extending across the planar surface substantially coextensive with the main control spool bore; and a second relief slot extending across the planar surface substantially coextensive with the compensator spool bore.

2. A working valve section as set forth in claim 1, wherein the first and second relief slots are each elongated and are each substantially perpendicular to the other.

3. A working valve section as set forth in claim 1, wherein the first and second relief slots are spaced from one another.

4. A working valve section as set forth in claim 1, including a second valve section, the second valve section includes a second housing having a second substantially planar surface, and the second substantially planar surface is attached to the first mentioned substantially planar surface.

5. A working valve section as set forth in claim 1, wherein the main control spool bore is substantially perpendicular to the compensator spool bore.

6. A working valve section as set forth in claim 1, wherein the relief slots are approximately 0.0005-0.002 inches deep.

7. A working valve section as set forth in claim 1, wherein the first relief slot is 10-50% wider than the spool bore.

8. A working valve section as set forth in claim 1, wherein the first relief slot is 10-25% wider than the spool bore.

9. A working valve section as set forth in claim 1, wherein the first relief slot is 20-50% wider than the spool bore.

10. A working valve section as set forth in claim 1, wherein the second relief slot includes rounded corners.

11. A working valve section for a sectional fluid control valve comprising:

a valve section housing having a substantially planar surface for being attached to an adjacent valve section housing;

a main control spool bore extending into the housing substantially parallel to the planar surface;

a compensator spool bore extending into the housing substantially parallel to the planar surface, the compensator spool bore being spaced from the main control spool bore; and a relief area extending across the planar surface substantially coextensive with the main control spool bore and the compensator spool bore;

wherein the substantially planar surface includes an area positioned between the main control spool bore and the compensator spool bore that protrudes above the relief area.

12. A working valve section as set forth in claim 11, wherein the relief area includes first and second relief slots that are each elongated and are each substantially perpendicular to the other.

13. A working valve section as set forth in claim 11, wherein the relief area includes first and second relief slots, wherein the first and second relief slots are spaced from one another.

14. A working valve section as set forth in claim 11, including a second valve section, the second valve section includes a second housing having a second substantially planar surface, and the second substantially planar surface is attached to the first mentioned substantially planar surface.

15. A working valve section as set forth in claim 11, wherein the main control spool bore is substantially perpendicular to the compensator spool bore.

16. A working valve section as set forth in claim 11, wherein the relief area includes first and second relief slots, wherein the relief slots are approximately 0.0005-0.002 inches deep.

17. A working valve section as set forth in claim 11, wherein the relief area includes a relief slot, wherein the relief slot is 10-50% wider than the spool bore.

18. A working valve section as set forth in claim 11, wherein the relief area includes a relief slot, wherein the relief slot is 10-25% wider than the spool bore.

19. A working valve section as set forth in claim 11, wherein the relief area includes a relief slot, wherein the relief slot is 20-50% wider than the spool bore.

20. A working valve section as set forth in claim 11, wherein the relief area includes a relief slot, wherein the relief slot includes rounded corners.

* * * * *